United States Patent
Keskula et al.

(10) Patent No.: US 7,348,084 B2
(45) Date of Patent: Mar. 25, 2008

(54) AIR DISTRIBUTION METHOD AND CONTROLLER FOR A FUEL CELL SYSTEM

(75) Inventors: Donald H. Keskula, Webster, NY (US); Bruce J. Clingerman, Palmyra, NY (US); Swaminathan Gopalswamy, Ann Arbor, MI (US); Shankar Akella, Canton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/185,660

(22) Filed: Jul. 20, 2005

(65) Prior Publication Data

US 2005/0255343 A1 Nov. 17, 2005

Related U.S. Application Data

(62) Division of application No. 10/021,727, filed on Dec. 12, 2001, now Pat. No. 6,942,937.

(51) Int. Cl.
*H01M 8/00* (2006.01)

(52) U.S. Cl. .......................................... 429/22; 429/34

(58) Field of Classification Search ................. 429/12, 429/13, 22, 23, 25, 34, 68.3, 98.3
See application file for complete search history.

(56) References Cited

U.S. PATENT DOCUMENTS

| 5,186,150 | A  | * | 2/1993  | Sekine ........................ 123/494 |
| 6,497,972 | B1 | * | 12/2002 | Iwasaki ........................ 429/13 |
| 2002/0006537 | A1 | * | 1/2002  | Kobayashi et al. ........... 429/26 |
| 2002/0164515 | A1 | * | 11/2002 | Oglesby et al. ............... 429/34 |
| 2003/0072984 | A1 | * | 4/2003  | Saloka et al. ................. 429/26 |

OTHER PUBLICATIONS

Chem Team: Gas Law—Ideal Gas Law attached from http://dbhs.wvusd.k12.ca.us/webdocs/GasLaw/Gas-Ideal.html.*

* cited by examiner

*Primary Examiner*—Patrick Joseph Ryan
*Assistant Examiner*—Monique Wills

(57) ABSTRACT

An airflow control system and method for a fuel cell includes a compressor that supplies air to a storage chamber for storing the air. Fuel cell subsystems are connected to the air storage chamber. Each of the fuel cell subsystems includes a flow controller and flow sensor. A sensor measures air pressure in the storage chamber. A controller polls the flow controllers of the fuel cell subsystems for a minimum required air pressure for the fuel cell subsystems. The controller selects a highest minimum required air pressure. The controller controls the compressor to provide the highest minimum required pressure in the air storage chamber. The air storage chamber includes tubing, a manifold or both.

10 Claims, 4 Drawing Sheets

# US 7,348,084 B2

AIR DISTRIBUTION METHOD AND CONTROLLER FOR A FUEL CELL SYSTEM

This is a division of application Ser. No. 10/021,727 filed on Dec. 12, 2001 now U.S. Pat. No. 6,942,937.

FIELD OF THE INVENTION

The present invention relates to fuel cells, and more particularly to the distribution of air in a fuel cell system.

BACKGROUND OF THE INVENTION

Fuel cell systems are increasingly being used as a power source in a wide variety of applications. Fuel cell systems have also been proposed for use in vehicles as a replacement for internal combustion engines. The fuel cells generate electricity that is used to charge batteries or to power an electric motor. A solid-polymer-electrolyte fuel cell includes a membrane that is sandwiched between an anode and a cathode. To produce electricity through an electrochemical reaction, hydrogen ($H_2$) is supplied to the anode and oxygen ($O_2$) is supplied to the cathode. In some systems, the source of the hydrogen is reformate and the source of the oxygen ($O_2$) is air.

In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane while the electrons flow through an electrical load (such as the batteries or the motor) that is connected across the membrane. In a second half-cell reaction, oxygen ($O_2$) at the cathode reacts with protons ($H^+$), and electrons ($e^-$) are taken up to form water ($H_2O$).

There are several fuel cell subsystems within a fuel cell system that require a separately controlled source of pressurized air. For example, these fuel cell subsystems include combustors, partial oxidation (POx) reactors, preferential oxidation (PrOx) reactors, the fuel cell stack and/or other fuel cell subsystems. The fuel cell subsystems typically employ mass flow controllers, mass flow sensors and one or more compressors to provide the air.

When two or more fuel cell subsystems require a controlled amount of pressurized air, some conventional fuel cell systems use a compressor for each subsystem. Each compressor is typically controlled based on the desired airflow that is required by the associated fuel cell subsystem. While this control method is accurate and relatively simple from a control standpoint, the duplication of compressors is undesirable from cost, weight and packaging standpoints.

In other conventional fuel cell systems, a single compressor supplies the air to all of the fuel cell subsystems. A controller sums the mass flow requirements for all of the fuel cell subsystems. The controller commands the compressor to provide the summed mass flow requirement. In this fuel cell control system, an overflow valve is typically required to bleed off excess air due to system errors. The transient response of this control method is inherently compromised due to coupling between the fuel cell subsystems. This control system also requires significant rework for any changes in the fuel cell system.

For example, when mass flow-based control is used and five fuel cell subsystems request 1 g/s flow, the controller sums the mass flow rates and attempts to provide 5 g/s. If one of the flow sensors is inaccurate, all of the fuel cell subsystems suffer. If one of the fuel cell subsystems has a faulty mass flow sensor or mass flow controller and the fuel cell subsystem actually achieves 1.5 g/s but requires 1 g/s, each of the other fuel cell subsystems are starved of air. Alternately, if the faulty fuel cell subsystem requests 2 g/s but gets only 1 g/s, all of the other fuel cell subsystems receive too much air. In other words, an error in one fuel cell subsystem causes errors in the delivery of air to all of the other fuel cell subsystems.

SUMMARY OF THE INVENTION

An airflow control system and method for a fuel cell according to the invention includes a compressor that supplies air to a storage chamber. Fuel cell subsystems are connected to the air storage chamber. A sensor measures air pressure in the storage chamber. A controller polls the fuel cell subsystems for a minimum required air pressure. The controller selects a highest minimum required air pressure. The controller controls the compressor to provide the highest minimum required pressure in the storage chamber.

In other features of the invention, the storage chamber includes tubing or a manifold or both. Each of the fuel cell subsystems includes a flow controller and flow sensor. The controller periodically polls the fuel cell subsystems for the minimum required air pressure. The flow controller preferably includes an electronic throttle valve. The flow sensor preferably includes a hot wire anemometer.

In other features of the invention, the fuel cell subsystems are selected from the group of combustors, partial oxidation (POx) reactors, preferential oxidation (PrOx) reactors, fuel cell stacks, a cathode inlet of a fuel cell stack, and an anode inlet of a fuel cell stack.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
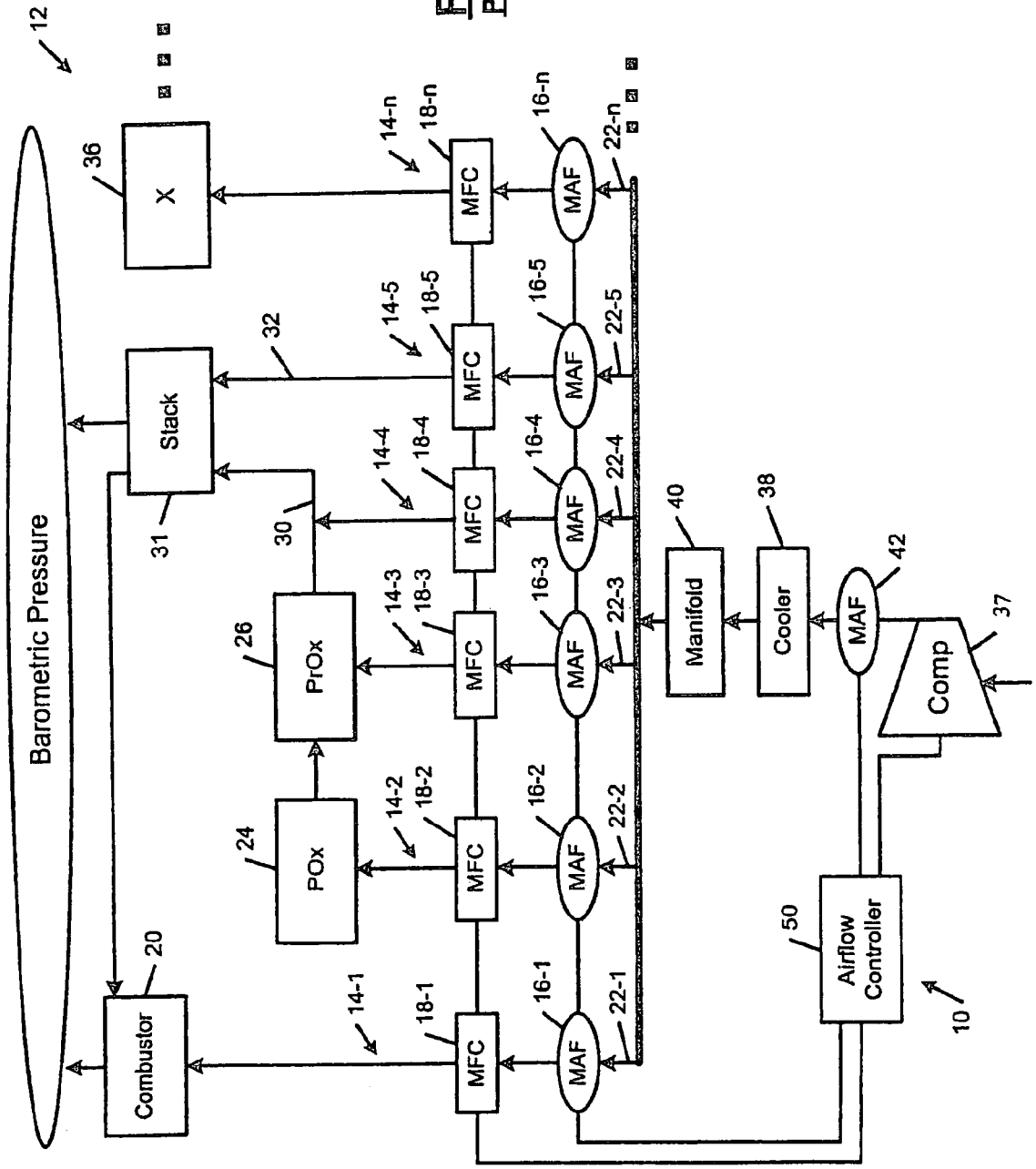
FIG. 1 is a schematic block diagram illustrating an airflow control system according to the prior art.

Referring now to FIG. 1, an air delivery system 10 for a fuel cell system 12 is illustrated. The fuel cell system 12 includes a plurality of fuel cell subsystems 14-1, 14-2, . . . 14-n that require the controlled delivery of air. For example, the fuel cell subsystem 14-1 includes a mass airflow sensor 16-1, a mass airflow controller 18-1, and a combustor 20.

The mass airflow sensor 16-1 measures the mass airflow of air flowing through the tubing 22-1. The mass airflow controller 18-1 adjusts and controls the mass airflow to the combustor 20. As can be appreciated, the mass flow controller 18-1 may be connected to one or more controllers that are associated with the combustor 20 or other fuel cell subsystems.

The other fuel cell subsystems 14-2, 14-3, . . . , 14-n likewise control the airflow to other fuel cell components. For example, the POx reactor 24 partially oxidizes the supply fuel to carbon monoxide and hydrogen (rather than fully oxidizing the fuel to carbon dioxide and water). Air and fuel stream are injected into the POx reactor 24. The advantage of POx over steam reforming of the fuel is that it is an exothermic reaction rather than an endothermic reaction. Therefore, the POx reaction generates its own heat. The mass airflow sensor 16-2 senses the airflow in the tubing 22-2. The mass airflow controller 18-2 adjusts and controls the airflow that is delivered to the POx reactor 24. The mass airflow controller 18-2 may be connected with one or more controllers that are associated with the POx reactor 24 or other fuel cell subsystems.

Similarly, mass airflow sensors 16-3, 16-4, 16-5, . . . , 16-n sense airflow in tubing 22-3, 22-4, 22-5, . . . , 22-n. Mass flow controllers 18-3, 18-4, 18-5, . . . , 18-n adjust and control the airflow that is delivered to a preferential oxidation (PrOx) reactor 26, an anode input 30 of a fuel cell stack 31, a cathode input 32 of the fuel cell stack 31, and any other fuel cell subsystems 36 that require air input.

The air is typically supplied by a compressor 37. A cooler 38 cools the air that is output by the compressor 37 to a manifold 40 and/or to the tubing 22. A mass flow sensor 42 senses the airflow that is produced by the compressor 37. An airflow controller 50 is connected to the mass airflow sensors 16 and 42, the mass airflow controllers 18, and the compressor 37. The airflow controller 50 sums the airflow requirements of each of the fuel cell subsystems 14 that require air input. The airflow controller 50 adjusts and controls the mass airflow of the compressor 37 to meet the summed airflow demand of the fuel cell subsystems 14.

Figure 2:
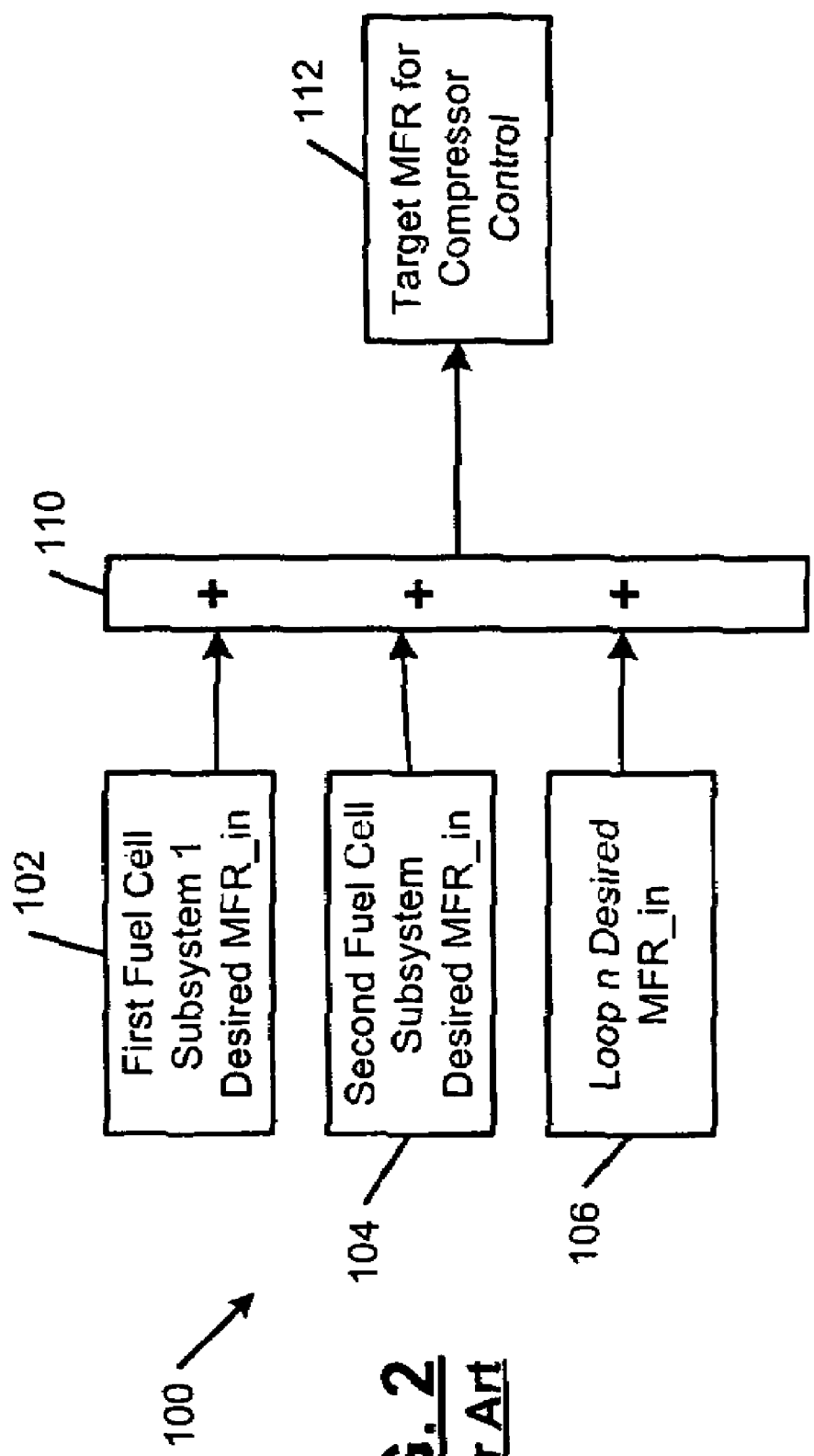
FIG. 2 is a simplified mass airflow-based control diagram in accordance with the prior art.

Referring now to FIG. 2, the control strategy of the mass flow-based airflow controller 50 is illustrated and is generally designated 100. The desired mass flow rate for first, second, . . . , and $n^{th}$ fuel cell subsystems 102, 104, and 106 are summed by a summer 110 to generate a target mass flow rate 112 for the compressor 37. The airflow controller 50 commands the compressor 37 to provide the target mass flow rate 112. In this control system, an overflow valve is typically required to bleed off excess air pressure that accumulates due to system errors. The transient response of this control method is compromised due to the coupling between the fuel cell subsystems. In other words, a control error in one fuel cell subsystem adversely impacts all of the fuel cell subsystems. This control system also requires significant rework for any changes in the fuel cell subsystems.

Figure 3:
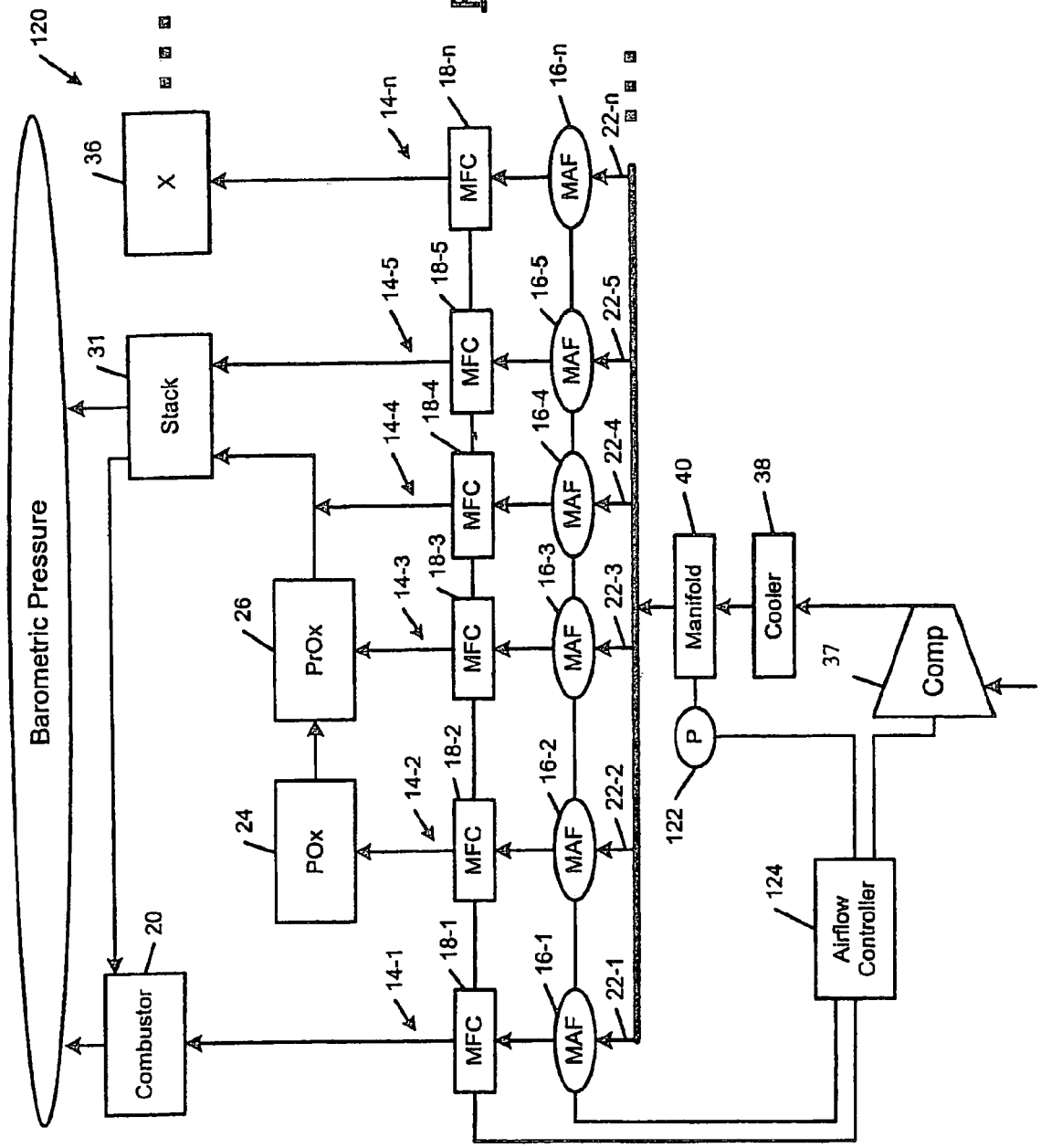
FIG. 3 is a schematic block diagram illustrating an airflow control system according to the present invention.

Referring now to FIG. 3, a pressure-based airflow control system 120 is illustrated. For purposes of clarity, reference numerals from FIG. 1 have been used where appropriate to identify the same elements. The pressure-based airflow control system 120 includes a pressure sensor 122 that measures air pressure in the manifold 40 and/or the tubing 22. The airflow controller 50 periodically polls the fuel cell subsystems 14 and requests the minimum air pressure that is required by each of the fuel cell subsystem 14. The fuel cell subsystems 14 provide the minimum required pressure. If no pressure is required, then the fuel cell subsystems 14 do not respond or respond with zero. One or more of the fuel cell subsystems 14 may have no pressure requirement during a given polling period. The airflow controller 50 selects the highest minimum pressure from the minimum required pressures output by the fuel cell subsystems 14. The airflow controller 50 controls the air pressure in the manifold 40 and/or tubing 22 to maintain the highest minimum required pressure for the fuel cell subsystems 14 until the subsequent polling period.

Referring now to FIG. 3, the control strategy employed by the airflow controller 124 in the pressure-based airflow control system 120 is shown in further detail. The airflow controller 124 monitors the pressure P of air in the manifold 40 and/or the tubing 22. The airflow controller 124 polls the fuel cell subsystems 14 for their highest minimum pressure. The airflow controller 124 selects the highest minimum required pressure $P_{min}$. The airflow controller 124 compares the monitored pressure P in the manifold 40 to the highest minimum required pressure $P_{min}$.

Figures 4, 5:
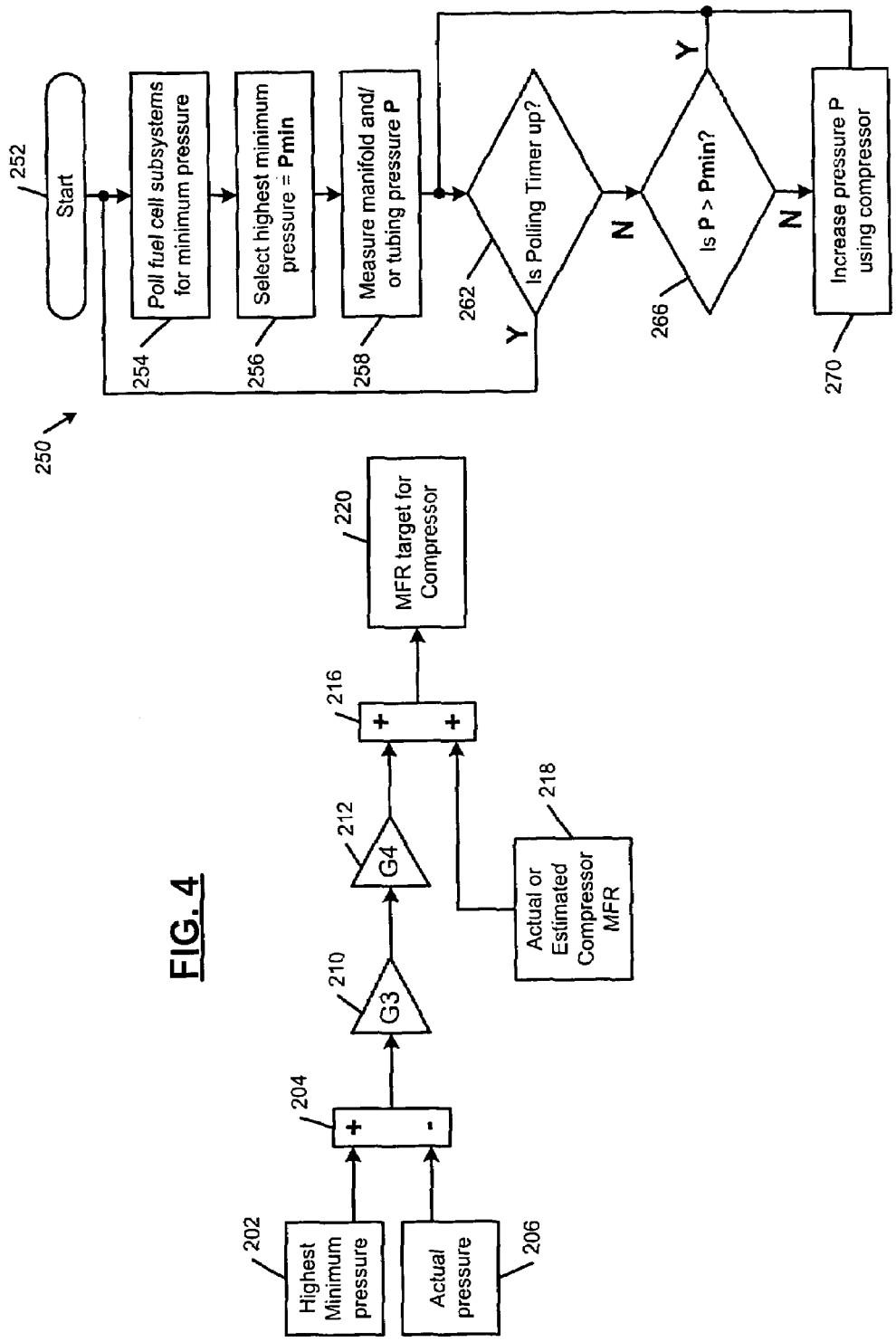
FIG. 4 is a pressure-based airflow control diagram according to the present invention.
FIG. 5 is a flowchart illustrating steps for controlling the compressor according to the present invention.

Referring now to FIG. 4, an actual pressure signal 206 that is generated by the pressure sensor 122 is input to an inverting input of the summer 204. The highest minimum required pressure $P_{min}$ 202 is input to a non-inverting input of the summer 204. An output of the summer 204 is input to one or more gain blocks 210 and 212. The gain block 210 provides a system pressure gain. The gain block 212 represents other required fuel cell system gains. An output of the gain block 212 is input to a summer 216. An actual or estimated compressor mass flow rate 218 is input to the summer 216. The compressor mass flow rate 218 can be estimated from the speed of the compressor 37 and the inlet and outlet pressure of the compressor 37. An output 220 of the summer 216 is equal to the target mass flow rate for the compressor 37.

Referring now to FIG. 5, steps for controlling the pressure-based airflow control system 120 are shown in further detail and are generally designated 250. Control begins with step 252, in which a polling timer that is associated with the airflow controller 124 is reset. In step 254, the airflow controller 124 polls the fuel cell subsystems 14 for their minimum pressure requirement. In step 256, the airflow controller 124 selects the highest minimum pressure $P_{min}$ that is required by the fuel cell subsystems 14. In step 258, the airflow controller 124 measures the pressure P in the manifold 40 and/or in the tubing 22. In step 262, the airflow controller 124 determines whether the polling timer is up. If it is, the polling timer is reset, then control continues with step 254. Otherwise, control continues with step 266. In step 266, the airflow controller 124 determines whether the measured pressure P exceeds the highest minimum pressure $P_{min}$. If the measured pressure P exceeds the highest minimum pressure $P_{min}$, then control continues with step 262. If the measured pressure P does not exceed the highest minimum pressure $P_{min}$, control continues with step 270. In step 270, the pressure P in the manifold 40 and/or the tubing 22 is increased using the compressor 37.

In the present invention, the fuel cell subsystem airflow dynamics are directly proportional to the pressure in the manifold and/or the tubing 22 and are not directly related to the mass flow rate of the compressor 37. The mass flow rate of the compressor 37 indirectly affects the dynamics of the fuel cell subsystems 14 by affecting the rate of change of the pressure P in the manifold 40 and/or the tubing 22. The airflow controller 124 provides much tighter transient control of the airflow to the fuel cell subsystems. In addition, the airflow controller 124 de-couples the interactions between the fuel cell subsystems to a larger extent than conventional airflow controllers. As a result, the downstream fuel cell subsystems can be more efficiently developed in a distributed manner.

The airflow controller 124 has improved disturbance rejection as compared to conventional airflow controllers. In addition, the mass airflow sensor that measures compressor airflow can be eliminated to reduce cost due to the lower coupling of the pressure of the pressure based control strategy. The mass flow rate of the compressor 37 can be estimated from the speed and input and output pressures of the compressor 37. The overflow valve or pressure regulator can also be eliminated. The airflow controller according to the present invention requires a single compressor to control the airflow to multiple fuel cell subsystems, which improves cost, complexity, weight and packaging. The airflow controller also supports distributed development of the fuel cell subsystems, simplifies the development process by decoupling the fuel cell subsystems, and increases the potential for modularity.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for controlling airflow to fuel cell subsystems in a fuel cell, comprising the steps of:
   supplying air to an air storage chamber;
   connecting a plurality of fuel cell subsystems to said air storage chamber;
   sensing air pressure in said air storage chamber; and
   polling each of said fuel cell subsystems for a minimum required air pressure.

2. The method of claim 1 further comprising the steps of:
   selecting a highest minimum required air pressure based on said minimum required air pressure for each of said fuel cell subsystems; and
   maintaining said highest minimum required air pressure in said air storage chamber.

3. The method of claim 1 wherein said air is provided by a compressor.

4. The method of claim 1 wherein said air storage chamber includes tubing providing fluid coupling between an air source and each of said plurality of fuel cell subsystems.

5. The method of claim 1 wherein said air storage chamber includes a manifold interposed between an air source and each of said plurality of fuel cell subsystem.

6. The method of claim 1 wherein said air storage chamber includes a manifold in fluid communication with an air source and tubing providing fluid coupling between said manifold and each of said plurality of fuel cell systems.

7. The method of claim 1 further comprising the step of periodically polling said plurality of fuel cell subsystems for said minimum required air pressure.

8. The method of claim 1 wherein each of said plurality of fuel cell subsystems includes a flow controller and a flow sensor.

9. The method of claim 8 wherein said flow controller includes an electronic throttle valve and said flow sensor includes a hot wire anemometer.

10. The method of claim 1 wherein said plurality of fuel cell subsystems include a component that is selected from the group consisting of combustors, partial oxidation reformer, preferential oxidation reactor, fuel cell stacks, a cathode inlet of a fuel cell stack, and an anode inlet of a fuel cell stack.

* * * * *